July 7, 1953 R. W. DOEG 2,644,731
PISTON AND ROD CONNECTION
Filed Dec. 13, 1950
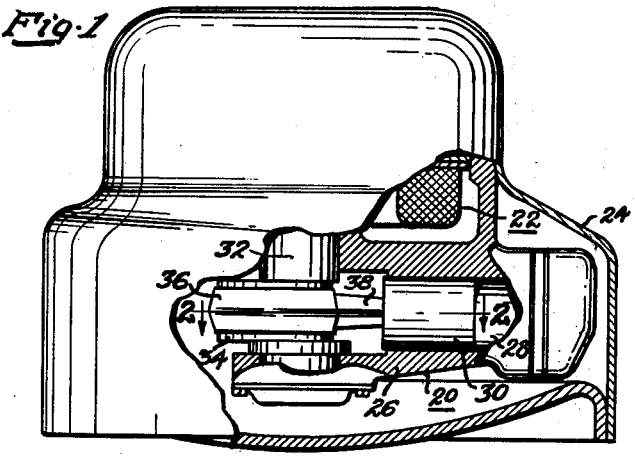
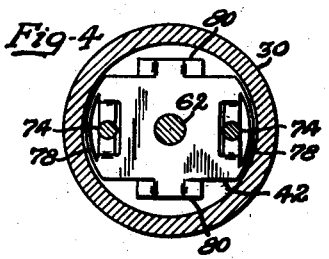
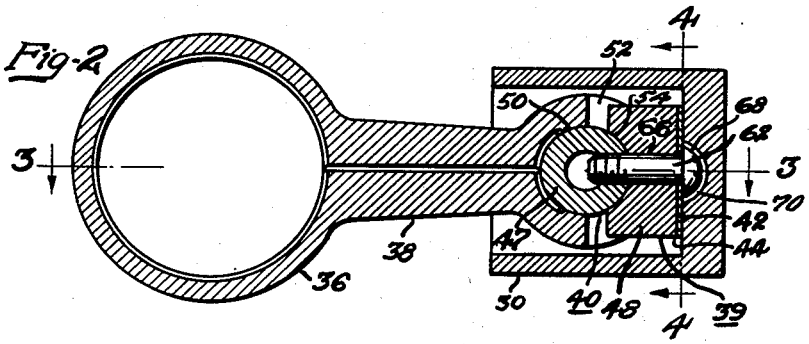
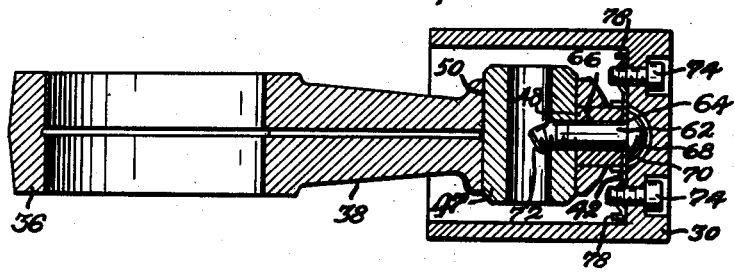
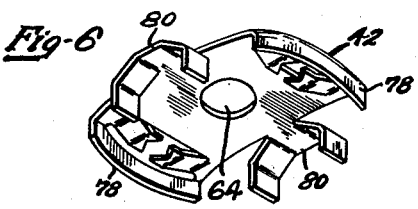
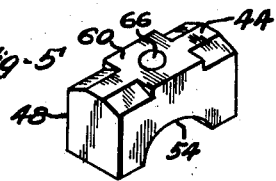
INVENTOR.
RALPH W. DOEG
BY
Ralph E. Baker
ATTORNEY Patented July 7, 1953

2,644,731

UNITED STATES PATENT OFFICE 2,644,731

PISTON AND ROD CONNECTION

Ralph W. Doeg, Detroit, Mich., assignor to Nash-Kelvinator Corporation, Detroit, Mich., a corporation of Maryland Application December 13, 1950, Serial No. 200,653

6 Claims. (Cl. 309—16)

This invention relates generally to refrigerating apparatus and more particularly to assemblies of piston and connecting rods forming a part of said apparatus.

One of the objects of my invention is to provide an improved piston-connecting rod assembly of the type in which the piston and rod are universally connected together to compensate for slight misalignment and resultant undue wear and noise of the parts.

Another object of the invention is to provide an improved universal coupling for a piston and connecting rod which makes practical the attachment of the coupling directly and solely to the piston to avoid objections inherent in attaching connecting rods by wrist-pins to piston skirts.

Another object of the invention resides in the provision of a flexible universal coupling for connection to a piston to allow slight canting of the rod to the piston to compensate for misalignment of piston bore and connecting rod.

Another object of the invention resides in the provision of a diaphragm-clip which forms part of my universal coupling and also functions to attach the universal coupling to the piston.

Further objects and advantages of the present invention will be apparent from the following description, reference being had to the accompanying drawings, wherein a preferred form of the present invention is clearly shown.

In the drawings:

Fig. 1 is a side view of a refrigerant motor-compressor unit embodying features of my invention and showing a portion thereof broken away;

Fig. 2 is a view shown in section of a piston-connecting rod assembly embodying features of my invention, taken along the line 2—2 of Fig. 1;

Fig. 3 is another view in section of the piston-connecting rod assembly, taken along the line 3—3 of Fig. 2;

Fig. 4 is a view in cross section of the piston-connecting rod, taken along the line 4—4 of Fig. 2;

Fig. 5 is an isometric illustration of a part of the piston-connecting rod assembly, shown removed therefrom; and Fig. 6 is an isometric illustration of another part of the piston-connecting rod assembly, shown removed therefrom.

Referring to the drawings by characters of reference, my invention is illustrated in connection with a refrigerant motor-compressor apparatus which comprises, in general, a compressor 20 and an electric motor 22. These units are housed and sealed in a casing 24. The compressor 20 has a cylinder block 26 provided with a horizontal bore 28 to receive a reciprocal piston 30, and the cylinder block 26 has suitable bearings for a vertical drive shaft 32, which is driven by the electric motor 22. A crank 34, on the drive shaft 32, rotates in one end or strap 36 of a connecting rod 38 which is operatively connected at its other end to the piston 30 by my universal coupling 39.

My universal coupling 39 comprises, in general, a rigid composite connecting member or coupling 40, a flexible coupling or diaphragm-clip 42, and a fulcrum member or rocker 44. The rigid coupling member 40 is connected rotatably to the rod 38; the diaphragm-clip 42 is attached to the piston; and the fulcrum 44 is interposed between coupling 40 and the diaphragm-clip.

To facilitate manufacture and assembly of the universal coupling, the rigid composite coupling member 40 is preferably made in two parts comprising a fulcrum member or wrist pin 47, and an extension member 48. The pin 47 rotatably connects the free end of the rod 38 to the rigid coupling member 40 and the other fulcrum 44 provides for canting action of the rod relative to the piston in a plane transverse to the plane of rotation of the rod about the wrist pin. As shown, the extension member 48 preferably carries the fulcrum 44 although it will be understood that, if desired, the fulcrum 44 may be carried by the diaphragm-clip 42. In either arrangement, the two fulcrums 47 and 44 are spaced longitudinally in the direction of reciprocation of the piston and co-operate to effect a universal action.

In the free end of rod 38, a bearing portion or transverse bore 50 receives the pin 47 to connect the parts rotatably together and a bifurcating slot 52 in the free end of the connecting rod 38 receives the extension member 48 which fits snugly in the slot and has a cylindrical socket 54 complementary to the cylindrical periphery of pin 47.

As shown more clearly in Fig. 5, the fulcrum 44 in the form of a narrow flat bearing surface is formed on the outer end of the extension member 48 and projecting therefrom engages the inner surface of the diaphragm-clip 42. The narrow fulcrum 44 extends transverse to the axis of pin 47 or so that rocking action will be transverse to the plane of rotation of the rod. Intermediate the sides of the extension member 48, the fulcrum 44 is interrupted by a flat bearing surface 60 which is coplanar with the fulcrum 44 and engages flat against the diaphragm-clip 42.

In order to obtain limited canting action of the connecting rod, I provide a single fastener or screw 62 to secure the diaphragm-clip 42 substantially centrally thereof to and flat against the adjacent end of the extension member 48, and also, I utilize the screw 62 to secure the coupling member parts, to wit: the pin 47 and extension member 48, rigidly together. The screw 62 extends through an aperture 64 in the diaphragm-clip 42 and through an aligning aperture 66 in the extension member 48 to thread into a tapped hole provided in the side of the pin 47. A head 68 on the screw 62 abuts the outer flat surface of the diaphragm 42 and is received in a clearance recess 70 in the piston. A shown, the relatively large bearing surface 60 of the extension member 48 locates within the outer periphery of recess 70 to aid in allowing canting action between the piston and extension member or to allow slight flexing of the diaphragm. The screw 62 is tightened down to clamp the parts together, and the inner end of the screw may project into the sleeve-like pin 47 and be bent over, as at 72, to lock the parts together.

The diaphragm-clip 42 is formed with a slight curvature so that when tightly held between the piston and extension member 48, the diaphragm-clip will be tensioned and exert a force opposing lineal movement of the rod 38 away from the piston 30 in a direction normal thereto. A pair of radially spaced screws 74 are provided to attach the diaphragm-clip 42 to the piston 30 outwardly of screw 62 and co-operate with screw 62 to hold the diaphragm-clip 42 under tension. The screws 74 may be of the so-called sheet metal type of screw, and the head of the piston may be recessed to receive the screw heads, as illustrated in Fig. 3. The diaphragm-clip 42 may be formed of any suitable resilient material, such as spring steel, and the body of the diaphragm-clip may be substantially rectangular in shape and have end reinforcing flanges 78. On its opposite side edges, I form the diaphragm-clip 42 with oppositely disposed spring finger sockets 80 which are adapted to receive the end portions of the interrupted fulcrum 44 and oppose tendency of the extension member 48 to rotate about the axis of screw 62. In the present construction, the extension member 48 has tapered surfaces leading down from the fulcrum surfaces 44, and the sockets 80 are formed complementary to said surfaces to provide close-fitting relationship between the parts.

In operation, the free end of the rod 38 will rotate about the axis of pin 47, and at the same time, the rod 38, pin 47 and extension member 42, as a rigid unit, will cant about the fulcrum 44. It will be understood that discrepancies in alignment of the connecting rod 38 and piston cylinder are usually small so that only a slight corresponding canting of the rod 38 is necessary to avoid binding of the parts. To effect slight canting of the rod 38 without binding and audible vibrations of contacting parts, the diaphragm-clip 42 is made to flex or deform slightly in the area thereof adjacent the coupling flat surface 60 where screw 62 secures the parts together. That is, a small central area of the diaphragm-clip flexes slightly to allow slight canting action of the rod while the fulcrum 44 engages the flat or unflexed portion of the diaphragm-clip by straddling said flexing portion.

From the foregoing description it will now be understood that I have provided an improved piston-connecting rod assembly in which a connecting rod is adapted to cant with, as well as rotate on, its bearing member or pin, and that such action is effected by attaching the bearing member at a single point of attachment to a spring-tensioned diaphragm-clip in such a manner as to allow for slight canting action between the parts without appreciable relative movement of the rod in a direction normal to the piston. It will also be understood that by attaching the universal coupling solely to the piston head, such operations of the past, as drilling holes in piston skirts for wrist pins, etc., are eliminated. In this connection it will also be understood that distortion of the piston skirt by press fitting wrist pins thereinto is eliminated and that the piston seal area which formerly extended from the piston head to the wrist pin bore may now extend the full area of the piston skirt. Furthermore, by eliminating the wrist pin bore in piston sleeves, the bearing area between the rod and piston may be increased—limited, of course, by the diameters of the pistons. In addition, I have provided a universal coupling which allows pistons to be made inexpensively—for example, such as by screw machine operations.

Although only a preferred form of the invention has been illustrated, and that form described in detail, it will be apparent to those skilled in the art that various modifications may be made therein without departing from the spirit of the invention or from the scope of the appended claims.

I claim:

1. In a piston-connecting rod assembly, a connecting rod end, a coupling member rotatably engaging said connecting rod end, a piston, a plate member interposed between said coupling member and an adjacent end of said piston, said plate member being formed with a curvature, means securing said plate member adjacent its outer periphery against said piston end, an abutment on said coupling member inwardly of said securing means engaging against one side of said plate member, a recess in said piston end overlying said abutment surface, fulcrum means on said coupling member on opposite sides of said abutment engaging said plate member outwardly of said recess, and a single fastener securing said plate member to said abutment and co-operable with said securing means to tension said plate member flat against the adjacent end of said piston.

2. In a piston-connecting rod assembly, a connecting rod end, a piston, a socket member opposite said connecting rod end, a pin connecting said socket member rotatably to said connecting rod end, a resilient plate against one end of said piston, securing means attaching said plate to said piston outwardly of the longitudinal axis of said piston, and a single fastener securing said plate, pin and socket member together and co-operating with said securing means to tension said plate.

3. A universal connection for use in connecting the free end of a connecting rod to a piston comprising, a coupling member for rotatable connection to the free end of the connecting rod, a diaphragm for connection to the piston, a fulcrum member on said coupling member fulcrumed on said diaphragm at the center thereof, and a fastener attaching said diaphragm solely at the center thereof to said fulcrum.

4. A universal connection for use in connecting the free end of a connecting rod to a piston comprising, a coupling member pin for rotatable connection with the free end of the connecting rod, a spring clip member for attachment to the piston, a single fastener attaching said spring clip to said coupling member, and a fulcrum on one of said members fulcrumed on the other of said members adjacent said single fastener.

5. A universal connection for use in connecting the free end of a connecting rod to a piston comprising, a coupling member for rotatable connection with the free end of the connecting rod, a fulcrum carried by said coupling member, a flexible plate having one side engaging said fulcrum, a flat bearing surface interrupting said fulcrum and engaging flat against the said one side of said flexible plate, and a single fastener extending through said flexible plate into said coupling member at said flat bearing surface to secure the flexible plate and coupling member together.

6. In a universal joint for connecting a piston to a connecting rod having a slotted end intersecting a transverse bearing, comprising a rigid coupling member to engage in the slotted end of the rod and having an outer end, a pin engaging said bearing, a fulcrum on the outer end of said coupling member, a flexible plate for attachment to the piston having one side engaging said fulcrum, and a fastener attaching said pin, coupling member and flexible plate together.

RALPH W. DOEG.

References Cited in the file of this patent

UNITED STATES PATENTS

| Number | Name | Date |
| --- | --- | --- |
| 1,450,177 | Houpert | Apr. 3, 1923 |
| 1,737,915 | Carrillo | Dec. 3, 1929 |
| 2,040,032 | Steele et al. | May 5, 1936 |
| 2,513,023 | Heusser | June 27, 1950 |